Patented July 12, 1949

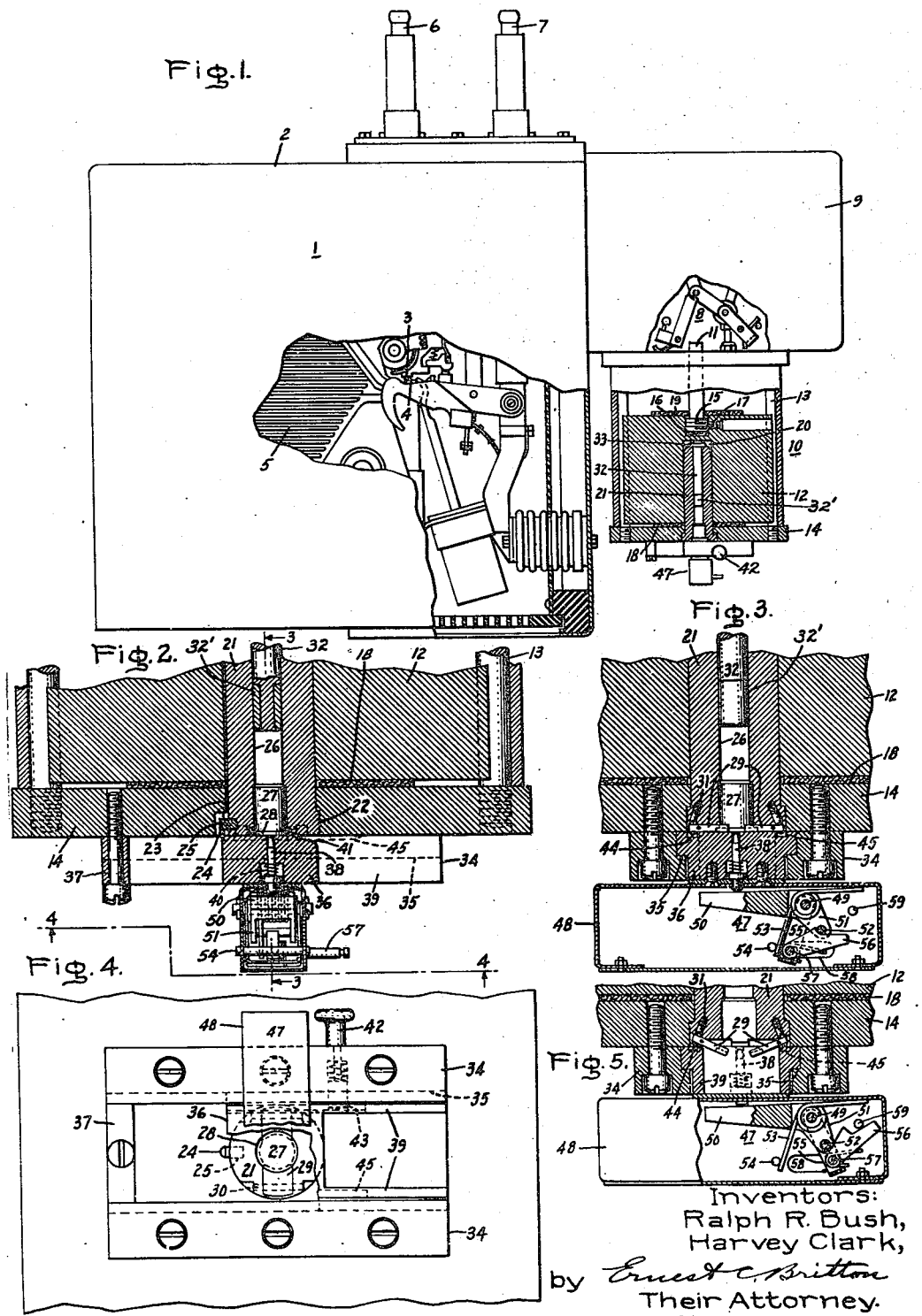

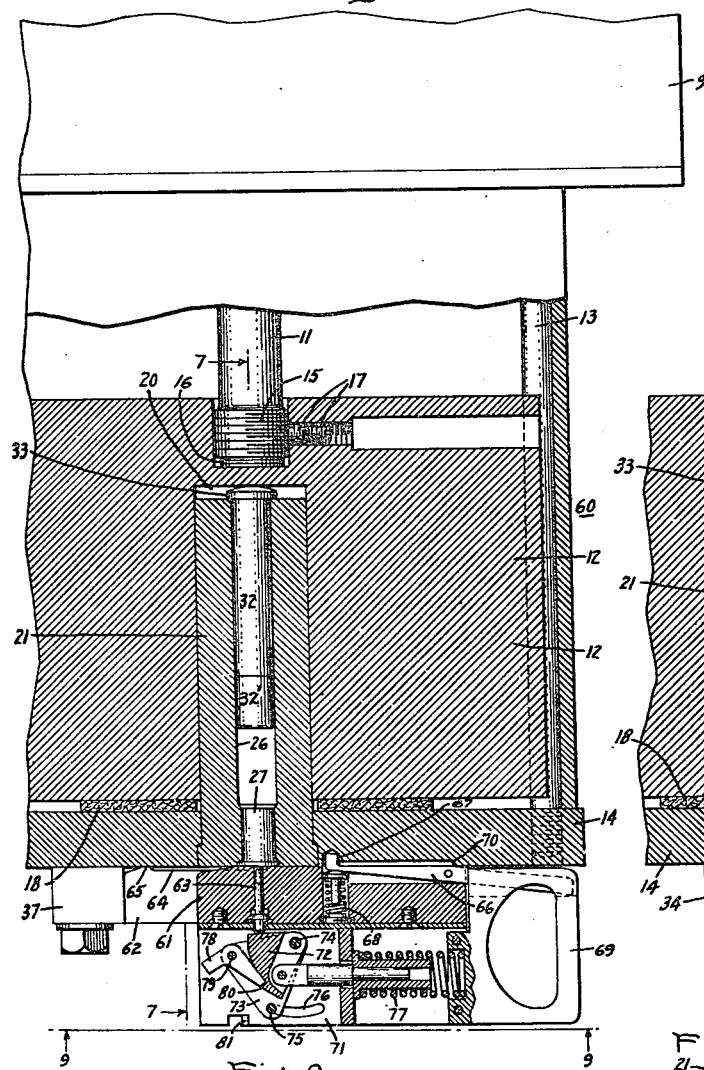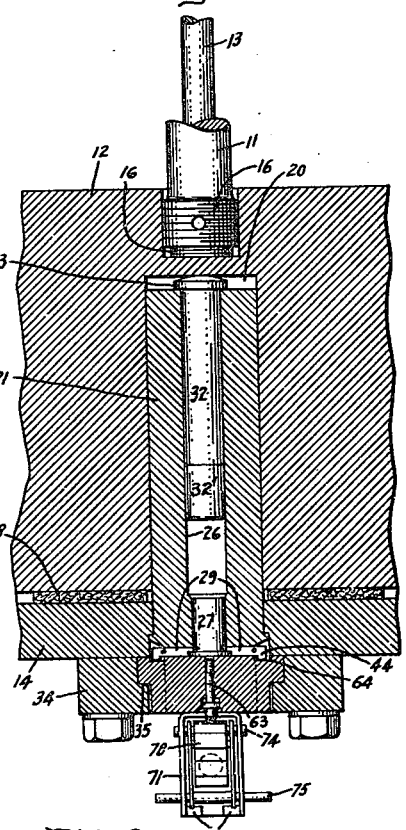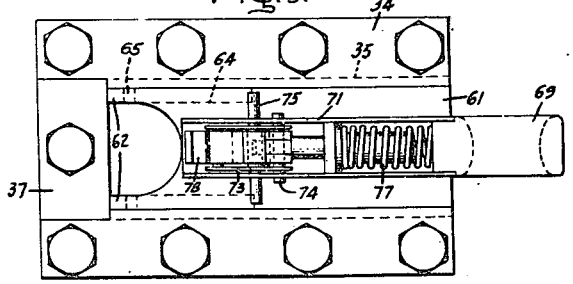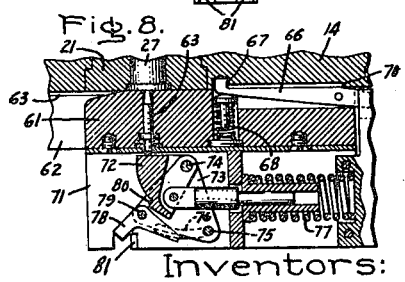
Inventors:
Ralph R. Bush,
Harvey Clark,
by Ernest C. Britton
Their Attorney.

2,476,024

UNITED STATES PATENT OFFICE 2,476,024

OPERATING MECHANISM

Ralph R. Bush, Upper Darby, Pa., and Harvey Clark, Camden, N. J., assignors to General Electric Company, a corporation of New York Application August 30, 1945, Serial No. 613,504

3 Claims. (Cl. 123—24)

Our invention relates to operating mechanisms, and more particularly to mechanisms for operating electric switches and circuit breakers employing an explosive charge as the actuating means. Specifically our invention is an improvement on United States Letters Patent 2,096,619, Prince, granted October 19, 1937, and assigned to the same assignee as the present application.

Certain operations such as the closing of power circuit breakers for example, requires the application of considerable force throughout a short distance and over a very short period of time. The closing operation of circuit breakers in addition to providing sufficient force for operating the mechanism against the magnetic forces which are present near the end of the closing stroke, also requires in a great many cases the provision of sufficient force to charge opening springs which are then in readiness for high speed opening of the circuit breaker. Generally heretofore the closing mechanisms for power circuit breakers have comprised solenoids, motor mechanisms, fluid motors and the like, and such mechanisms have assumed a large part of the breaker cost as compared with the amount of time that the mechanisms are in use. A simple and inexpensive operating mechanism which is capable of efficiently applying adequate closing force is therefore highly desirable.

It is an object of our invention to provide an improved operating mechanism of the aforesaid type which shall be positive and efficient in operation and simple, compact and inexpensive in construction.

It is another object of our invention to provide a circuit breaker operating mechanism employing an explosive charge as the actuating means which is capable of providing the desired closing force throughout the closing operation.

A further object of our invention is to provide a circuit breaker operating mechanism whose actuating means is an explosive charge, and in which the suddenly released actuating force derived from said charge is moderated or controlled by utilizing the inertia of an appropriate and considerable mass associated therewith.

Further objects and advantages of our invention will become apparent as the following description proceeds and the features of novelty which characterize our invention will be pointed out with particularity in the claims annexed to and forming a part of this specification.

For a better understanding of our invention reference may be had to the accompanying drawings in which Fig. 1 is an elevational view partly in section, of an electric circuit breaker embodying our invention; Fig. 2 is an enlarged sectional view of a portion of the operating mechanism shown in Fig. 1; Fig. 3 is a sectional view taken on line 3—3 of Fig. 2, with the firing mechanism in a predetermined position and the explosive charge in readiness for use assuming that Fig. 2 shows a complete device; Fig. 4 is a view taken on line 4—4 of Fig. 2 with certain portions of Fig. 4, however, broken away assuming Fig. 2 shows a complete device; Fig. 5 is a view similar to Fig. 3 with the operating mechanism in a position to receive the explosive charge and with the firing mechanism in the position it assumes following firing of the charge; Fig. 6 is a sectional view similar to Fig. 2 illustrating a modification of our invention; Fig. 7 is a sectional view taken on line 7—7 of Fig. 6 assuming that Fig. 6 shows a complete device; Fig. 8 is a view of a portion of the device shown in Fig. 6 with the firing mechanism in the position it assumes following ignition of the explosive charge; and Fig. 9 is a view taken on line 9—9 of Fig. 6 assuming that Fig. 6 shows a complete device.

Although our invention may be applicable to any sort of electric switch or circuit breaker, we have chosen to illustrate it as being applied to an electric circuit breaker of the type disclosed by Linde Patent 2,293,513, granted August 18, 1942, and assigned to the same assignee as the present application. Such a circuit breaker is particularly applicable for use in metal-clad installations which are widely used today.

Referring now to Fig. 1 there is illustrated an electric circuit breaker generally indicated at 1 comprising a housing structure 2, including a pair of relatively movable contacts 3 and 4, and an associated arc chute 5. Contacts 3 and 4 are connected to suitable breaker terminals 6 and 7 which are associated with a suitable power circuit to be controlled. Generally such circuit breakers are polyphase circuit breakers, although our invention is equally applicable to single phase circuit breakers. The details of such a circuit breaker form no part of the present invention.

Prior to our invention circuit breakers of the type illustrated in Fig. 1 were usually operated to the closed position by a solenoid operating mechanism which included a trip free thrust transmitting linkage, generally indicated at 8 in Fig. 1 and housed in an enclosure 9 supported from housing 2. In arrangements used heretofore, a solenoid for actuating a movable plunger was mounted directly below housing 9 to transmit a force to the collapsible thrust transmitting linkage 8 for closing the circuit breaker, which linkage was suitably latched in the breaker closed position and opening springs (not shown) were also held in the charged position by such latching means. Such operating mechanism and linkage forms no part of our invention but is illustrated as substantially identical with the arrangement disclosed and claimed in prior copending Baskerville application, Serial No. 567,468, filed December 9, 1944, now Patent No. 2,458,240, and assigned to the same assignee as the present application.

Our invention is particularly concerned with the motive means generally indicated at 10 in Fig. 1 which is adapted to replace the solenoid arrangement of the prior art and to actuate the plunger 11 during a closing operation, which plunger 11 functions exactly in the manner of the solenoid actuated plunger described in the above mentioned Baskerville patent.

Operating mechanisms employing an explosive charge as the actuating means for electric circuit breakers have been known for many years and in this regard attention is directed to Read Patent 723,183, granted March 17, 1903, and assigned to the same assignee as the present application. Such operating mechanisms, prior to our invention, have not been developed commercially for the reason that prior art arrangements did not properly utilize the forces produced which are substantially instantly available and which should be more profitably distributed over a predetermined period of time. Also, at the date of the Read invention, slow burning powder, which is essential to a commercially feasible powder-operated mechanism for electric circuit breakers, was not available as it is today. It is believed that two features of our invention have made possible a commercially practical device as contrasted with the more or less impractical prior art arrangements. These are the use of a moving piston of relatively small diameter of substantially the diameter of the cartridge containing the explosive charge, and secondly, the provision of a movable mass of considerable magnitude which is effective to receive, momentarily store, then deliver, an appreciable part of the peak energy transmitted to the moving piston by the exploded charge. The significance of these characteristic features will be further explained as the description proceeds.

Referring now to Figs. 1 to 5 of the drawing, there is illustrated a considerable cylindrical mass 12 arranged for vertical movement and guided by suitable guide rods 13. These guide rods 13 support a base 14 so that consequently the entire motive means 10 depends from housing 9. Plunger 11 is threadedly mounted as indicated at 15 in a recess in the upper end of mass 12. A plurality of shims 16 are provided in the recess to properly position plunger 11 relative to mass 12 and when this proper positioning is obtained plunger 11 is locked to mass 12 by means of suitable set screws 17. A suitable resilient washer 18 may be provided for cushioning mass 12 relative to base 14 and if desired a similar resilient washer 19 may be provided at the other end of mass 12.

Mass 12 is provided with a longitudinal bore 20 arranged in axial alignment with plunger 11, which bore is in sliding relationship about a cylinder 21 which, in effect, forms the stationary barrel of the powder-operated mechanism of our invention. Cylinder 21 is provided with a circumferential flange 22 at the lower end thereof, which is adapted to cooperate with a counterbore in the opening 23 in base 14 so that, when a breech block is applied below cylinder 21, the latter is anchored securely in base 14. A recess 24 in base 14 is adapted to receive a dowel pin 25 mounted in cylinder 21 so that cylinder 21 must be positioned in a predetermined manner and cannot rotate therefrom. Since the mass 12 is guided for reciprocal up and down movement by the guide rods 13, it follows that the bore 20 of the mass 12 may constitute a side support for the cylinder 21 at all times.

Cylinder 21 is provided with a bore 26 having a diameter which is preferably of the order of 5/8 inch, or the like, so as to be of substantially the same diameter as cartridge 27 containing the explosive charge which is adapted to be inserted into the lower end of cylinder 21. As is customary, cartridge 27, which is very similar to an ordinary rifle cartridge except that it is considerably shorter, is provided with a flanged portion 28 for limiting its position in bore 26, a suitable counter-bore for this flanged portion 28 being provided. Flange 28 specifically permits suitable ejectors generally indicated at 29, which are pivotally mounted in recesses in cylinder 21 as indicated at 30 in Fig. 4, to eject the cartridge under certain conditions as will be brought out in the following description. If desired, suitable compression springs 31, see Figs. 3 and 5, may be provided to cause ejectors 29 to assume normally the non-ejecting position shown in Fig. 3 rather than the ejecting position shown in Fig. 5. It will be understood that the ends of ejectors 29 which engage the flange 28 of cartridge 27 are shaped to fit the circumferential surface of cartridge 27, as is clearly shown in Fig. 4.

Reciprocally arranged within bore 26 of cylinder 21 is a piston 32, which piston 32 has a very small diameter as compared with prior art devices, which diameter is substantially that of cartridge 27. Piston 32 is provided with a sealing ring 32' which is preferably formed of hard copper or a copper alloy. A suitable enlargement 33 at the upper end of piston 32 limits the lowermost position thereof while abuttingly engaging the considerable mass 12 in thrust relationship as shown in the drawings.

At this stage of the description it will be apparent that, assuming the cartridge 27 to be backed up by a suitable breech block, the detonation of a gunpowder charge contained in 27 would cause an explosion productive of high pressure forces against piston 32 for closing circuit breaker 1. For producing optimum mechanical efficiency from an explosive charge, including one using the above mentioned so-called slow burning powder, it is known that the charge should burn while subject to some appreciable pressure. Accordingly, in carrying out our invention we encourage high pressure generation by using the above described small diameter cylinder and piston which permits little expansion space rather than, on the other hand, providing the large expansion space such as was contemplated in the prior art and as shown, for example, in each of the above mentioned Prince and Read patents. However, the energy produced from such favorable pressure producing conditions is characterized by possessing a high peak of force toward the beginning of the stroke, which peak tapers off as the stroke continues in what may be described as a force-time characteristic of descending order. Such a characteristic is not inherently suited for closing a circuit breaker for, as already intimated, the opposition to closing presented throughout the stroke by a circuit breaker has a load-time characteristic of ascending order which reaches a peak toward the end of the stroke as the mechanism drives the breaker contacts closed against opposition from the breaker opening springs, contact springs, and possible short circuit stresses.

In accordance with our invention, we have reconciled the above defined dissimilar and conflicting force-time and load-time characteristics of actuating charge and actuated breaker respectively by interposing the considerable mass 12 between the explosively driven small diameter piston 32 and the thrust transmitting structure 8. As clearly indicated in the drawings, the magnitude of mass 12 is out of all proportion to any other function it might assume, such as furnishing the already described incidental side support for the cylinder 21, so that it will be clear that the prime purpose of mass 12 is that of receiving and momentarily storing much of the premature peak energy of the explosive charge and later automatically delivering this stored kinetic energy back to the mechanism for overcoming the peak resistance to breaker closing which occurs toward the end of the stroke. By way of concrete illustration, while reducing to practice the operating mechanism of our invention, we found that we achieved optimum results when the mass 12 was made to approximate the equivalent mass of the remaining mechanism and breaker moving parts. Accordingly, the term, "considerable mass," used herein is indicative of one which comprises a substantial part of the sum total of mass constituted by all the moving parts which are motivated by the actuating charge.

Those skilled in the art will discern that the considerable mass 12 of our invention serves as an inertia buffer which is effective to moderate substantially the intensity of the suddenly liberated explosive peak force which might otherwise be severe enough to overstress component parts of the thrust transmitting linkage mechanism 8. Such parts beyond the mass 12 therefore can be made lighter than would be required if the mass 12 were omitted. With the arrangement described thus far, it will be seen that cylinder 21 and consequently piston 32 may readily be removed for inspection and also for the purpose of cleaning the same, which is a very desirable feature for a gunpowder mechanism.

Supported from base 14 by suitable fastening means are a pair of spaced guides or ways 34, each provided with a shoulder 35 for supporting a sliding breech block generally indicated at 36, which breech block is slidable in a horizontal plane on ways 34. Movement of breech block 36 in one direction is limited by a stop 37 which extends across one end of ways 34 and is suitably bolted to base 14, as is clearly indicated in Figs. 2 and 4. Sliding breech block 36 comprises a relatively solid portion for supporting a firing pin 38 and a pair of spaced extensions 39 best shown in Figs. 4 and 5. When sliding breech block 36 is positioned in guides or ways 34, cylinder 21 is held in position in base 14 and the bore 20 of mass 12 and even if the sliding breech is moved against stop 37 to the position indicated in Fig. 5, spaced extensions 39 of sliding breech block 36 will still be positioned under cylinder 21 to hold it in position. In other words, sliding breech block 36 must be moved to the right as viewed in Figs. 2 and 4, so as to be substantially removed from ways or guides 34 before cylinder 21 can be taken out. However, when sliding breech block 36 is moved against stop 37, the extensions 39 thereof are separated sufficiently so that ejectors 29 are free to act and access to cartridge 27 may readily be had both for removal thereof and replacement.

The primary purpose of sliding breech block 36 is to accommodate firing pin 38 which is reciprocally movable in an opening provided therein. A suitable spring 40 may be provided to act against an enlargement of firing pin 38 which may be arranged in a counter-bore in breech block 36 to normally bias firing pin 38 out of the firing position. Preferably firing pin 38, when actuated in a manner to be described hereinafter, indents cartridge 27 and explodes a primer provided in the end of the cartridge, which in turn explodes the charge of slow burning powder contained therein.

In order that sliding breech block 36 may aid in insuring that cartridge 27 is in position, the solid portion thereof is provided with a cam surface 41 (Fig. 2) which cam surface is designed to force cartridge 27 into position in moving breech block 36 from its loading position against stop 37, shown in Fig. 5, to its loaded position shown in Fig. 2.

It is desirable that breech block 36 be latched when in the loaded position indicated in Fig. 2 and to this end there is provided a manually actuated latch 42, see Figs. 1 and 4, which is spring biased to the latching position and adapted to engage in an opening 43 as is shown in Fig. 4, in one of the extensions 39 of breech block 36. When the breech block 36 is moved from its loading position against stop 37 toward the right, as viewed in Fig. 1, manually actuable latching member 42 will latch it in position as soon as the proper position is reached. In order to remove breech block 36 from ways or guides 34 it is also necessary to release latching means 42, whereupon movement to the right of breech block 36, as viewed in Fig. 2, may be accomplished, and not only may breech block 36 be removed but also cylinder 21 and piston 32. Since the sliding breech ways or guides 34 remain bolted to the operating mechanism, it is impossible to assemble the breech block and cylinder as a separate unit so as to misuse it as a gun, which is another desirable feature of applicants' invention. At the same time, this arrangement permits ready removal of the cylinder or barrel 21 for cleaning purposes and the like.

As was pointed out above, extractors or ejectors 29 which are adapted to grasp the flange 28 of cartridge 27 are pivotally mounted at one end of cylinder 21. In order to actuate these extractors to the extracting position when breech block 36 is moved to the loading position against stop 37, as shown in Fig. 5, each extractor 29 is provided with a cam member 44 which is normally arranged to slide in grooves or recesses 45 provided on either side of breech block 36. The recesses 45 terminate midway along the extensions 39 and end with a curved end to provide a cam surface for engaging the cams 44 on extractors 29, as is clearly shown in Fig. 5, to move these extractors to the extracting position against the bias of compression springs 31. With this arrangement cartridge 27 is automatically ejected and a new cartridge readily may be inserted.

In accordance with our invention, there is provided a trigger assembly generally indicated at 47 which comprises a housing 48 bolted to the bottom of breech block 36 as is clearly indicated in Fig. 3. Housing 48 may be formed of metal or plastic and is shaped like a transverse rectangular bar which serves as a suitable handle to provide the manual means for operating breech block 36. The end of firing pin 38 is adapted to extend into housing 48, as is clearly shown in Figs. 2, 3 and 5. Pivotally mounted on a fixed pivot 49 in housing 48 is a hammer member 50 which has a portion arranged directly beneath firing pin 38 so as to be in a position to strike firing pin 38 when explosion of the powder contained in cartridge 27 is desired. Pivotally mounted hammer 50 is provided with a pair of crank-like extensions 51 for supporting a latching pin 52. A suitable spring 53 is arranged to bias hammer 50 in a clockwise direction, as viewed in Fig. 3, against firing pin 38. A suitable stop 54 limits the biasing action of spring 53. A U-shaped member 55 also pivotally mounted at 49 supports at its lower end a pivoted spring biased latch or trigger 56 which is adapted to engage latching pin 52, as is clearly shown in Fig. 3. In order to actuate hammer 50 a pin 57 upon which latching member 56 is pivotally mounted, extends through slots 58 provided in the walls of housing 48. If pin 57 is moved to the right, as viewed in Fig. 3, along slot 58 counter-clockwise, rotation of hammer 50 will result since latching member 56 is in latching engagement with pin 52, with the consequent stressing of spring 53. After a predetermined movement of the hammer mechanism an extension on latching member or trigger 56 will engage a stop 59 to cause unlatching thereof, whereupon hammer 50 is suddenly released for striking firing pin 38. In Fig. 5 the latching member 56 is shown in the unlatched position against stop 59.

It should be understood that any suitable charge of slow-burning smokeless powder may be used in cartridge 27. We have found it particularly desirable to employ both an ignition and a propellant powder in cartridge 27, the ignition powder generally being in the form of a fine powder while the propellant powder is in the form of beads or small cylinders.

It will be obvious that with the arrangement described above a self interlocking firing pin arrangement is provided in that cartridge 27 must be properly enclosed in cylinder 21 before firing pin 38 can cause firing thereof.

Although the arrangement described above has been illustrated as being associated with a mechanism which requires a pushing force to close the circuit breaker, it should be obvious that our invention can equally well be applied to a mechanism in which a pulling force is required.

In view of the detailed description included above, it is believed that the operation of the circuit breaker operating mechanism will be obvious to those skilled in the art.

In Figs. 6, 7, 8 and 9 a modification of the motive means 10 of Fig. 1 is illustrated. This motive means generally indicated at 60, is in many respects very similar to the arrangements disclosed in Figs. 1 to 5 and the corresponding parts thereof are designated by the same reference numerals. The only substantial difference between the modification illustrated in Figs. 6 to 9, as compared with the arrangement described thus far, resides in the sliding breech block and hammer assembly which will be described in detail hereinafter. In Figs. 6 to 9 a sliding breech block 61 is provided which includes a pair of extensions 62, which in the firing position are against stop 37. The solid portion of breech block 61 is provided with a cam surface which functions to force the cartridge 27 into position in the same manner as cam 41 described above. Breech block 61 also accommodates a firing pin 63 substantially identical with the firing pin 38 described above.

Breech block 61 is also provided with recesses 64 on either side thereof for accommodating the cams 44 associated with extractors 29. A projection 65 best shown in Figs. 6 and 9, on extensions 62 is adapted to engage with the cams 44 of ejectors 29 when breech block 61 is moved to the loading position which involves movement to the right as viewed in Fig. 6.

A pivotally mounted latching member 66 is provided which engages with a recess 67 in base 14. A suitable spring 68 normally biases pivotally mounted latching member 66 into the latching position as is clearly shown in Figs. 6 and 8. In order to operate breech block 61, a D-shaped handle 69 is provided and pivotally mounted latch 66 is arranged to extend in a manner to partially block the opening in D-shaped handle 69, as is best shown in Fig. 6. When an operator inserts his hand into the opening in handle 69 and moves his hand upwardly, release of latch 66 is obtained and breech block 61 may be moved to the right until latch 66 engages with a shoulder 70 in base 14. When in this position, breech block 61 is in the loading position and cams 65 will have operated ejectors 29. Breech block 61 may be completely removed from ways or guides 34 by a further actuation of latch 66 to clear shoulder 70, whereupon barrel 21 and piston 32 may be removed.

Supported from breech block 61 is a housing 71 within which is supported the hammer mechanism including the hammer 72 with which is associated a pair of side plates 73 pivotally mounted at 74. An actuating pin 75 extends through side plates 73 and also extends through elongated slots 76 in housing 71 whereby pivotal movement of side plates 73 may occur. The hammer 72 is normally biased to just touch firing pin 63 by means of a spring 77. A trigger 78 pivotally mounted at 79 to side plates 73 is adapted to engage with a latching portion 80 of hammer 72, as is clearly shown in Fig. 6. To actuate hammer 72, pin 75 is moved to the right along slots 76, thereby causing counter-clockwise rotation of the entire hammer assembly, including trigger 78 about pivot 74 with the resultant stressing of spring 77. Upon a predetermined pivotal movement of side plates 73, an end of trigger 78 engages with a stop 81 punched out of the side of housing 71, whereupon hammer 72 is released, as is clearly shown in Fig. 8, and is driven against firing pin 63 to fire cartridge 27.

It will be observed that the housing for the hammer assembly in Fig. 6 is arranged parallel with breech block 61 rather than transversely thereof as in Figs. 1 to 5. With this arrangement the housing does not provide as satisfactorily a handle for operating breech block 61 and consequently handle 69 is provided. The operation of the arrangement disclosed in Figs. 6 to 9, which is substantially like that of the arrangement disclosed in Fig. 1, will be obvious to those skilled in the art.

While we have shown and described various embodiments of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States, is:

1. Operating mechanism for an electric circuit breaker comprising a movable mass arranged to move when said operating mechanism is actuated, a cylinder removably supported within said mass, a piston operable in said cylinder, means for generating pressure for actuating said piston comprising a cartridge containing an explosive charge in one end of said cylinder, said cartridge having a diameter substantially the same as the diameter of said piston, a breech block slidably mounted below said cylinder for holding both said cylinder and said cartridge in position, a firing pin in said breech block for exploding said charge to actuate said piston, a pivotally mounted extractor at the end of said cylinder for extracting said cartridge, and means responsive to movement of said breech block to the loading position for actuating said extractor.

2. Operating mechanism for an electric circuit breaker comprising a movable mass arranged to move when said operating mechanism is actuated, a cylinder removably supported within said mass, a piston operable in said cylinder, means for generating pressure for actuating said piston comprising a cartridge containing an explosive charge in one end of said cylinder, a breech block slidably mounted below said cylinder for holding both said cylinder and said cartridge in position, a firing pin in said breech block for exploding said charge to actuate said piston, a pivotally mounted extractor at the end of said cylinder for extracting said cartridge, and means comprising a cam on said breech block responsive to movement of said breech block to the loading position thereof for engaging said extractor to actuate the same.

3. Operating mechanism for an electric circuit breaker comprising a vertically disposed cylinder, a piston operable in said cylinder, an explosive cartridge in the lower end of said cylinder of substantially the same diameter as said piston, means for exploding said cartridge to cause said piston to move upwardly, and a movable bored inertia member disposed in sliding relationship about said cylinder and having a portion thereof disposed above said piston and normally in engagement therewith.

RALPH R. BUSH.
HARVEY CLARK.

REFERENCES CITED

The following references are of record in the file of this patent:

UNITED STATES PATENTS

| Number | Name | Date |
|---|---|---|
| 1,043,393 | Bock | Nov. 5, 1912 |
| 1,229,951 | Hatch | June 12, 1917 |
| 2,096,619 | Prince | Oct. 19, 1937 |
| 2,132,148 | Davis | Oct. 4, 1938 |
| 2,140,214 | Temple | Dec. 13, 1938 |